United States Patent
Kishi et al.

(10) Patent No.: US 9,945,275 B2
(45) Date of Patent: Apr. 17, 2018

(54) OIL LEVEL REGULATING APPARATUS FOR AN ENGINE

(71) Applicant: TAIHO KOGYO CO., LTD., Toyota-shi, Aichi (JP)

(72) Inventors: Yoshinobu Kishi, Toyota (JP); Naoto Noguchi, Toyota (JP); Masahiro Kawahara, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 345 days.

(21) Appl. No.: 14/765,683

(22) PCT Filed: Feb. 5, 2014

(86) PCT No.: PCT/JP2014/052654
§ 371 (c)(1),
(2) Date: Aug. 4, 2015

(87) PCT Pub. No.: WO2014/123149
PCT Pub. Date: Aug. 14, 2014

(65) Prior Publication Data
US 2015/0377096 A1 Dec. 31, 2015

(30) Foreign Application Priority Data
Feb. 5, 2013 (JP) ................................. 2013-020306

(51) Int. Cl.
*F01M 1/08* (2006.01)
*F01M 1/16* (2006.01)
(Continued)

(52) U.S. Cl.
CPC ............... *F01M 1/08* (2013.01); *F01M 1/16* (2013.01); *F01M 1/20* (2013.01); *F16K 11/044* (2013.01);
(Continued)

(58) Field of Classification Search
CPC ... F01M 1/08; F01M 1/16; F01M 1/20; F16K 11/044; F16K 31/0627
See application file for complete search history.

(56) References Cited

U.S. PATENT DOCUMENTS 3,309,934 A * 3/1967 Gustafsson ............... F16H 3/12
192/3.57
2009/0229561 A1* 9/2009 Yamashita ............... F01M 1/16
123/196 R
(Continued)

FOREIGN PATENT DOCUMENTS

CN 1386992 A 12/2002
CN 102165161 A 8/2011
(Continued)

OTHER PUBLICATIONS

Extended European Search Report dated Sep. 14, 2016, issued by the European Patent Office in corresponding European Application No. EP 14749079.1 (7 pages).
Office Action dated Jun. 3, 2016, by the Chinese Patent Office in corresponding Chinese Patent Application No. 201480007357.0. (8 pages).
International Search Report (PCT/ISA/210) dated Mar. 11, 2014, by the Japanese Patent Office as the International Searching Authority for International Application No. PCT/JP2014/052654.

*Primary Examiner* — Kevin A Lathers
(74) *Attorney, Agent, or Firm* — Buchanan Ingersoll & Rooney PC

(57) ABSTRACT

An oil level regulating apparatus includes a valve unit and a solenoid unit. The valve unit includes a housing having an inflow hole, an outflow hole, and a leak hole, a partition separating the outflow hole and the leak hole, defining a valve chamber close to the outflow hole, and having a partition continuous hole, a valve dividing the valve chamber into an introduction chamber and a pressure chamber and having a valve continuous hole, and a valve biasing member biasing the valve. The solenoid unit has a shaft configured to open and close a leak channel. The shaft can open and close the leak channel on the downstream side of (Continued)

the pressure chamber. When the shaft closes the leak channel, the valve is switched to a closed valve state of closing the outflow hole.

12 Claims, 10 Drawing Sheets

(51) Int. Cl.
    *F16K 31/383* (2006.01)
    *F16K 11/044* (2006.01)
    *F16K 31/06* (2006.01)
    *F01M 1/20* (2006.01)
    *F01P 3/08* (2006.01)

(52) U.S. Cl.
    CPC ...... *F16K 31/0627* (2013.01); *F16K 31/3835* (2013.01); *F01M 2001/083* (2013.01); *F01P 3/08* (2013.01)

(56) References Cited

U.S. PATENT DOCUMENTS

| 2010/0230637 A1 | 9/2010 | Iwase et al. |
| 2013/0152883 A1 | 6/2013 | Perotto et al. |

FOREIGN PATENT DOCUMENTS

| JP | 60-026871 A | 2/1985 | |
| JP | 64-41783 U | 3/1989 | |
| JP | 2009-097372 A | 5/2009 | |
| JP | 2011-026541 A | 2/2011 | |
| WO | 2006097834 A2 | 9/2006 | |
| WO | WO 2010/029085 A1 | 3/2010 | |
| WO | WO 2010029085 A1 * | 3/2010 | ............... F01P 3/10 |

* cited by examiner

OIL LEVEL REGULATING APPARATUS FOR AN ENGINE

TECHNICAL FIELD

The present invention relates to an oil level regulating apparatus configured to regulate a flow rate of oil supplied to a sliding portion or the like provided between a piston jet or a crank shaft and a bearing.

BACKGROUND ART

Patent Literature 1 discloses an oil level regulating apparatus for a piston jet. As shown in FIG. 1 of this literature, the oil level regulating apparatus includes a valve unit and a solenoid unit. The valve unit and the solenoid unit are disposed separately from each other. The valve unit and the solenoid unit are axially perpendicular to each other.

An engine is provided with an oil channel. The oil channel is provided with a piston jet path and a pressure introducing path. The valve unit includes a valve configured to open and close the piston jet path. Specifically, the piston jet path can be opened if the valve is shifted to the rear side. In contrast, the piston jet path can be closed if the valve is shifted to the front side.

The valve has a front surface that receives pressure (supply pressure) of oil from the piston jet path. The valve has a rear surface to which pressure (control pressure) of oil is introduced from the piston jet path through the pressure introducing path. The pressure introducing path is opened and closed by a shaft of the solenoid unit.

When the shaft opens the pressure introducing path, supply pressure is applied to the front surface of the valve whereas control pressure is applied to the rear surface of the valve. The supply pressure and the control pressure are balanced in this state. The supply pressure and the control pressure accordingly offset each other. The valve unit is provided with a spring biasing the valve toward the front (so as to be closed). The valve accordingly closes the piston jet path with biasing force of the spring. The piston jet is not supplied with oil in this case.

When the shaft closes the pressure introducing path, supply pressure is applied to the front surface of the valve. However, no control pressure is applied to the rear surface of the valve. In this case, the valve is shifted depending on the magnitude correlation between the biasing force of the spring and a load of the supply pressure. The piston jet path is opened if the load of the supply pressure is larger than the biasing force of the spring. The piston jet is thus supplied with oil in this case.

CITATION LIST

Patent Literature

Patent Literature 1: WO 2010/029085 A

SUMMARY OF THE INVENTION

Problem to be Solved by the Invention

In the oil level regulating apparatus according to this literature, however, the pressure introducing path needs to be disposed on the oil channel of the engine such that control pressure is introduced to the rear surface of the valve. In other words, the pressure introducing path not essentially relevant to oil supply needs to be disposed in the engine. Such disposition complicates the structure of the engine.

In view of the above, it is an object of the present invention to provide an oil level regulating apparatus that does not require disposition of a pressure introducing path on an oil channel of an engine.

Solutions to the Problem (1) In order to achieve the object mentioned above, an oil level regulating apparatus according to the present invention includes: a valve unit including a cylindrical housing having an inflow hole opened at a first axial end, an outflow hole opened in a side wall, and a leak hole disposed at a second axial end of the outflow hole, a partition separating the outflow hole and the leak hole in the housing, defining a valve chamber close to the outflow hole, and having a partition continuous hole axially penetrating the partition, a valve disposed in the valve chamber, configured to reciprocate axially, dividing the valve chamber into an introduction chamber close to the inflow hole and a pressure chamber close to the partition, and having a valve continuous hole axially penetrating the valve, and a valve biasing member disposed in the valve chamber and biasing the valve toward the first axial end; and a solenoid unit including a solenoid having a reciprocable shaft; wherein a leak channel is defined as an oil channel including the inflow hole, the introduction chamber, the valve continuous hole, the pressure chamber, the partition continuous hole, and the leak hole, the shaft is configured to open and close the leak channel on a downstream side of the pressure chamber, and the valve is switched to a closed valve state of closing the outflow hole when the shaft closes the leak channel.

The oil level regulating apparatus according to the present invention includes the valve unit and the solenoid unit. The valve unit includes the valve. The valve divides the valve chamber into the introduction chamber and the pressure chamber so as to be variable in capacity. The valve is provided with the valve continuous hole. Oil can be accordingly supplied from the introduction chamber to the pressure chamber through the valve continuous hole.

When the shaft closes the leak channel on the downstream side of the pressure chamber, the downstream end of the pressure chamber is sealed. Meanwhile, the pressure chamber is supplied with oil through the valve continuous hole. The pressure chamber and the introduction chamber are thus made equal in internal pressure. The valve is shifted toward the first axial end (toward a closed valve position) by the biasing force of the valve biasing member to close the outflow hole. The oil level regulating apparatus thus comes into the closed valve state.

In contrast, when the shaft opens the leak channel on the downstream side of the pressure chamber, oil in the pressure chamber leaks out of the housing through the leak channel. The pressure chamber is accordingly decreased in internal pressure. The valve is shifted toward the second axial end (toward an opened valve position) and is likely to open the outflow hole. The oil level regulating apparatus is thus likely to come into an opened valve state.

As described above, the valve is provided with the valve continuous hole in the oil level regulating apparatus according to the present invention. The pressure introducing path does not need to be disposed on the oil channel of the engine in this configuration. The structure of the engine is not complicated in this case.

(1-1) In the above configuration (1), preferably, the valve has an opened valve switch hole in communication with the introduction chamber and the opened valve switch hole communicates with the outflow hole if the valve is in the opened valve state of opening the outflow hole.

The present configuration can secure communication between the inflow hole and the outflow hole through the opened valve switch hole in the opened valve state. The valve is less likely to receive on its outer surface a load of flowing oil. The present configuration accordingly facilitates switching from the opened valve state to the closed valve state. This configuration can reduce variation between pressure for switching from the opened valve state to the closed valve state and pressure for switching from the closed valve state to the opened valve state. In other words, this configuration can reduce hysteresis for opening and closing the valve.

(1-2) In the above configuration (1-1), preferably, at least one of an outer peripheral surface of the valve and an inner peripheral surface of the housing has an annular continuous groove in communication with the outflow hole in the opened valve state, and the opened valve switch hole causes the introduction chamber and the continuous groove to communicate with each other, to form an opened valve oil supply channel having the inflow hole, the introduction chamber, the opened valve switch hole, the continuous groove, and the outflow hole in the opened valve state.

The continuous groove has the annular shape and is disposed in at least one of the outer peripheral surface of the valve and the inner peripheral surface of the housing. The present configuration can secure communication between the opened valve switch hole and the outflow hole even in a case where the valve rotates in the opened valve state.

(1-3) In the above configuration (1), preferably, at least one of the outer peripheral surface of the valve and the inner peripheral surface of the housing has an annular pressure introducing groove in communication with the outflow hole in the closed valve state.

The present configuration achieves introduction of pressure lower than atmospheric pressure or internal pressure of the introduction chamber (hereinafter, abbreviated as "atmospheric pressure or the like") to the pressure introducing groove through the outflow hole in the closed valve state. The valve thus receives atmospheric pressure or the like on its entire circumference. This configuration can reduce sliding friction of the valve switched from the closed valve state to the opened valve state, as compared to a case where the valve locally receives atmospheric pressure or the like. The oil level regulating apparatus is thus likely to switch from the closed valve state to the opened valve state.

(2) In the above configuration (1), preferably, the solenoid unit is disposed at the second axial end of the housing, the valve unit and the solenoid unit are provided integrally with each other, the leak hole is opened in the side wall, and the shaft and the partition continuous hole are linearly aligned along the axis of the housing and the shaft axially opens and closes the partition continuous hole.

The oil level regulating apparatus according to Patent Literature 1 includes the valve unit and the solenoid unit disposed separately from each other. This configuration leads to increase in size of the oil level regulating apparatus. In contrast, the valve unit and the solenoid unit are provided integrally with each other in the present configuration. This configuration achieves reduction in size of the oil level regulating apparatus.

In the oil level regulating apparatus according to Patent Literature 1, the valve unit and the solenoid unit are axially perpendicular to each other. That is, the opening of the pressure introducing path and the shaft of the solenoid unit are axially perpendicular to each other. When the opening of the pressure introducing path is opened or closed, the shaft radially separates from or contacts with the opening. The shaft needs to shift by the entire diameter length of the opening when the opening is opened or closed. This configuration leads to increase in stroke of the shaft.

In contrast, the shaft and the partition continuous hole (part of the leak channel) are linearly aligned along the axis of the housing in the present configuration. In other words, the solenoid unit and the valve unit are disposed coaxially with each other. The shaft thus axially separates from or contacts with the partition continuous hole. This configuration achieves decrease in stroke of the shaft.

(2-1) In the above configuration (2), the shaft is preferably provided, on its outer peripheral surface at the first axial end, with a shaft tapered portion pointed toward the first axial end.

Even in a case where the shaft and the partition continuous hole are eccentric with each other, the shaft tapered portion in the present configuration achieves correction of the eccentricity. The shaft can be thus brought into coaxial contact with the partition continuous hole. This configuration can suppress generation of a gap between the shaft and the partition continuous hole in the closed valve state.

(2-2) In the above configuration (2) or (2-1), the partition continuous hole is preferably provided, on its inner peripheral surface at the second axial end, with a continuous hole tapered portion pointed toward the first axial end.

Even in the case where the shaft and the partition continuous hole are eccentric with each other, the continuous hole tapered portion in the present configuration achieves correction of the eccentricity. The shaft can be thus brought into coaxial contact with the partition continuous hole. This configuration can suppress generation of a gap between the shaft and the partition continuous hole in the closed valve state.

Particularly by combining the present configuration and the above configuration (2-1) and matching the shaft tapered portion and the continuous hole tapered portion in slant angle, the shaft and the partition continuous hole can be made in surface contact with each other in the closed valve state.

(3) In the above configuration (1) or (2), the shaft preferably opens the leak channel when the solenoid loses magnetic force. Cancellation of the magnetic force of the solenoid (e.g. upon being switched off or out of order) in the present configuration achieves setting to smaller valve opening pressure. This configuration can thus secure communication between the inflow hole and the outflow hole.

(4) In the above configuration (3), the solenoid preferably has a shaft biasing member biasing the shaft so as to be distant from the leak channel. When the magnetic force of the solenoid is canceled in the present configuration, biasing force of the shaft biasing member achieves setting to smaller valve opening pressure.

(5) In any of the above configurations (1) to (4), preferably, the housing is disposed on a piston jet trunk path of the oil channel having a crank shaft trunk path and the piston jet trunk path branched on a downstream side of an oil filter, and a plurality of piston jet branch paths branch connected to the piston jet trunk path and configured to supply a piston jet with the oil, the shaft controls to close the leak channel in a cold period immediately after an engine starts and the engine is not yet warmed, and the shaft controls to open the leak channel in a warm period after the engine is warmed.

The oil level regulating apparatus according to the present configuration is disposed on the piston jet trunk path. The apparatus can thus inclusively regulate flow rates of oil supplied to the plurality of piston jets. The shaft closes the leak channel in the cold period in the present configuration. The oil level regulating apparatus thus comes into the closed valve state. Communication between the inflow hole and the outflow hole can be blocked in the closed valve state. In other words, flow rates of oil supplied to all the piston jets can be regulated to zero. This configuration can thus prevent excessive cooling of the piston at low temperature.

The shaft opens the leak channel in the warm period. The oil level regulating apparatus is thus likely to come into the opened valve state. Communication between the inflow hole and the outflow hole can be secured in the opened valve state. In other words, oil can be supplied to all the piston jets. This configuration can thus achieve cooling of the piston at high temperature.

(6) In any of the above configurations (1) to (5), preferably, the valve has a closed valve switch hole in communication with the introduction chamber, and the closed valve switch hole communicates with the outflow hole in the closed valve state. The present configuration can secure communication between the inflow hole and the outflow hole through the closed valve switch hole in the closed valve state.

Effect of the Invention

The present invention achieves provision of an oil level regulating apparatus that does not require disposition of a pressure introducing path on an oil channel of an engine.

EMBODIMENTS OF THE INVENTION

An oil level regulating apparatus according to each embodiment of the present invention will now be described below.

First Embodiment

Disposition of Oil Level Regulating Apparatus

Figure 1:
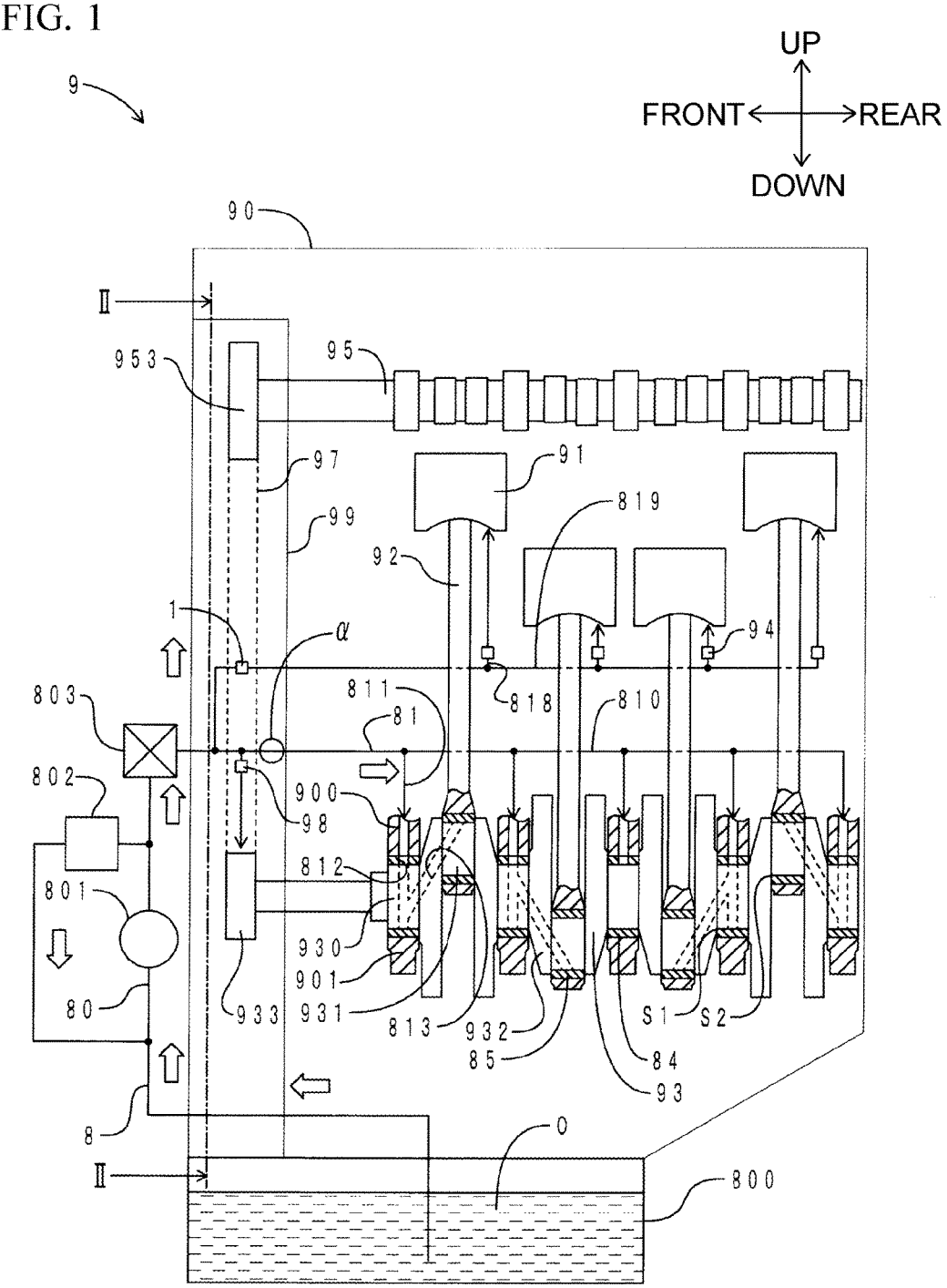
FIG. 1 is a layout diagram of an oil level regulating apparatus according to a first embodiment.
Figure 2:
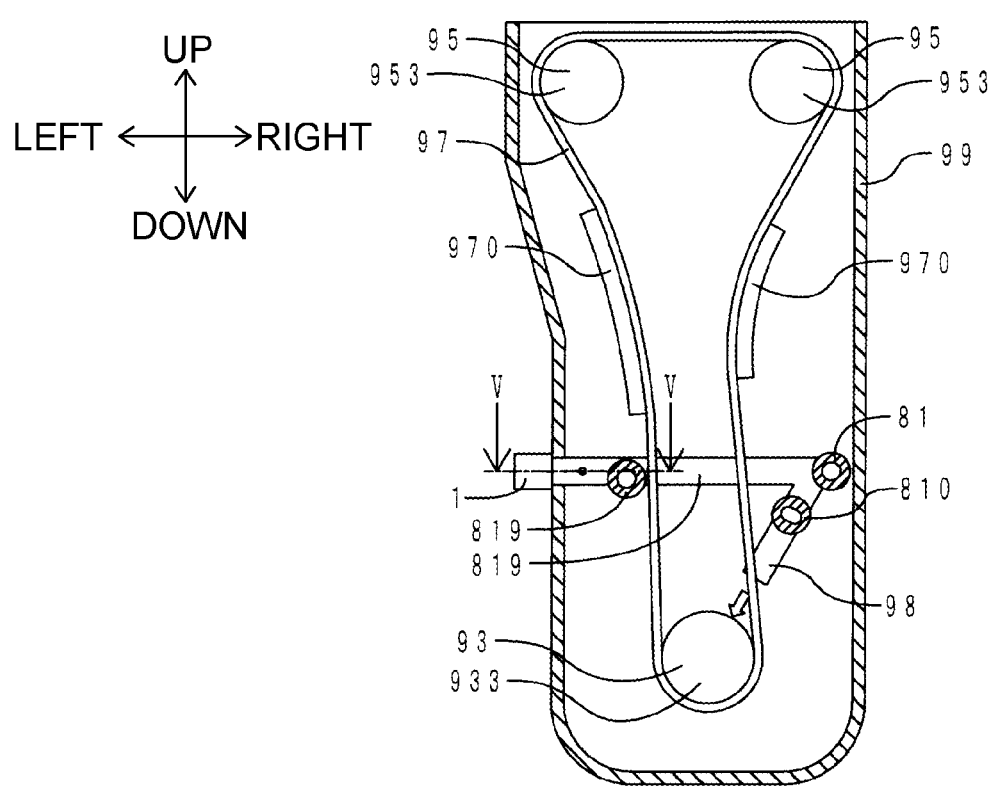
FIG. 2 is a sectional view taken along line II-II indicated in FIG. 1.

An oil level regulating apparatus according to the present embodiment will be described initially. FIG. 1 is a layout diagram of the oil level regulating apparatus according to the present embodiment. FIG. 2 is a sectional view taken along line II-II indicated in FIG. 1. As shown in FIGS. 1 and 2, an engine 9 includes a cylinder block 90, a plurality of pistons 91, a plurality of connecting rods 92, a crank shaft 93, a plurality of piston jets 94, a plurality of cam shafts 95, a timing chain 97, a chain jet 98, a chain cover 99, a plurality of main bearings 84, and a plurality of crank bearings 85.

The crank shaft 93 includes a plurality of main journals 930, a plurality of crank pins 931, a plurality of crank arms 932, and a crank shaft timing gear 933. The plurality of crank pins 931 is eccentrically connected to the plurality of main journals 930 with the plurality of crank arms 932 being interposed therebetween. The crank shaft timing gear 933 is disposed at an axial end of the crank shaft 93.

The main bearing 84 rotatably surrounds the main journal 930. A main sliding portion S1 is provided between the inner peripheral surface of the main bearing 84 and the outer peripheral surface of the main journal 930. The main bearing 84 is attached between a support portion 900 of the cylinder block 90 and a cap 901. The plurality of main bearings 84 thus rotatably supports the crank shaft 93 relative to the cylinder block 90.

The crank bearing 85 rotatably surrounds the crank pin 931. A pin sliding portion S2 is provided between the inner peripheral surface of the crank bearing 85 and the outer peripheral surface of the crank pin 931.

The connecting rod 92 rotatably surrounds the crank pin 931 with the crank bearing 85 being interposed therebetween. A piston 91 is attached to the connecting rod 92. The piston jet 94 can jet oil O to the rear surface of the piston 91.

As shown in FIG. 2, there are the two aligned cam shafts 95. The cam shafts 95 each have a cam shaft timing gear 953. The cam shaft timing gear 953 is disposed at an axial end of the cam shaft 95.

The timing chain 97 is tightly provided, by pressing force of a pair of tension levers 970, between the pair of cam shaft timing gears 953 and the crank shaft timing gear 933. The chain jet 98 can supply the oil O to the timing chain 97.

The chain cover 99 is made of steel and provided at the front surface of the cylinder block 90. The chain cover 99 accommodates the timing chain 97, the pair of cam shaft timing gears 953, the crank shaft timing gear 933, the pair of tension levers 970, and an oil level regulating apparatus 1 to be described later. The chain cover 99 is integrally provided, in its wall, with part of a crank shaft path 81 of an oil channel 8 to be described later.

The oil channel 8 includes a discharge path 80 and the crank shaft path 81. The discharge path 80 is provided with an oil pan 800, an oil pump 801, a relief valve 802, and an oil filter 803. The oil O is reserved in the oil pan 800.

The relief valve 802 inclusively regulates a flow rate of the oil O discharged from the oil pump 801. Specifically, the relief valve 802 is likely to open if the relief valve 802 has small valve opening pressure. This setting can reduce the flow rate of the oil O flowing from the oil pump 801 to the oil filter 803. In contrast, the relief valve 802 is unlikely to open if the relief valve 802 has large valve opening pressure. This setting can increase the flow rate of the oil O flowing from the oil pump 801 to the oil filter 803.

The crank shaft path 81 includes a main oil hole 810, a plurality of crank shaft branch paths 811, a plurality of main bearing internal paths 812, a plurality of crank shaft internal paths 813, a sub oil hole 819, and a plurality of piston jet branch paths 818. The main oil hole 810 is included in the concept of the "crank shaft trunk path" according to the present invention. The sub oil hole 819 is included in the concept of the "piston jet trunk path" according to the present invention.

The main oil hole 810 and the sub oil hole 819 are branch connected to the downstream end of the oil filter 803. As shown in FIG. 2, the branched portion between the main oil hole 810 and the sub oil hole 819 is provided integrally with the wall of the chain cover 99.

The crank shaft branch path 811 is provided inside the support portion 900. The crank shaft branch path 811 is branch connected to the main oil hole 810. The main bearing internal path 812 is provided inside the main bearing 84. The main bearing internal path 812 is connected to the crank shaft branch path 811. The main bearing internal path 812 is connected to the main sliding portion S1.

The plurality of crank shaft internal paths 813 is provided inside the crank shaft 93. The crank shaft internal paths 813 connect the main sliding portion S1 and the pin sliding portion S2.

The piston jet branch path 818 is branch connected to the sub oil hole 819. The piston jet 94 is connected to the piston jet branch path 818.

In this manner, parallelly connected to the downstream end of the oil filter 803 of the oil channel 8 are the main oil hole 810 configured to supply the oil O to the sliding portions (the main sliding portion S1 and the pin sliding portion S2) and the sub oil hole 819 configured to supply the oil O to the piston jet 94.

The oil level regulating apparatus 1 according to the present embodiment is disposed in the sub oil hole 819. In other words, the oil level regulating apparatus 1 according to the present embodiment is disposed upstream of the plurality of piston jet branch paths 818.

[Configuration of Oil Level Regulating Apparatus]

The configuration of the oil level regulating apparatus according to the present embodiment will be described next. In the following figures, the transverse direction corresponds to the "axial direction of the housing" according to the present invention. The right end corresponds to the "first axial end of the housing". The left end corresponds to the "second axial end of the housing".

Figure 3:
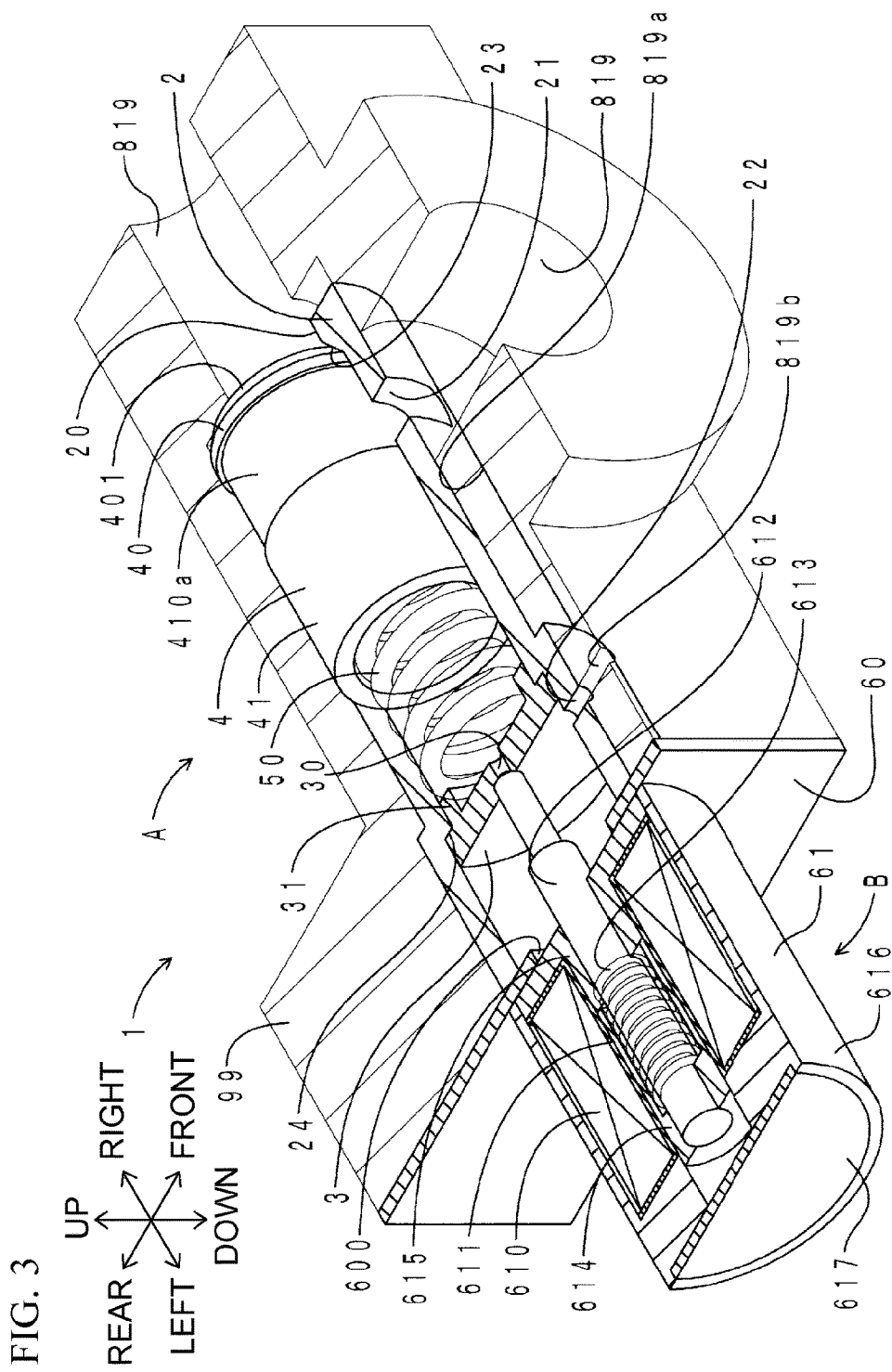
FIG. 3 is a perspective sectional view of the oil level regulating apparatus.
Figure 4:
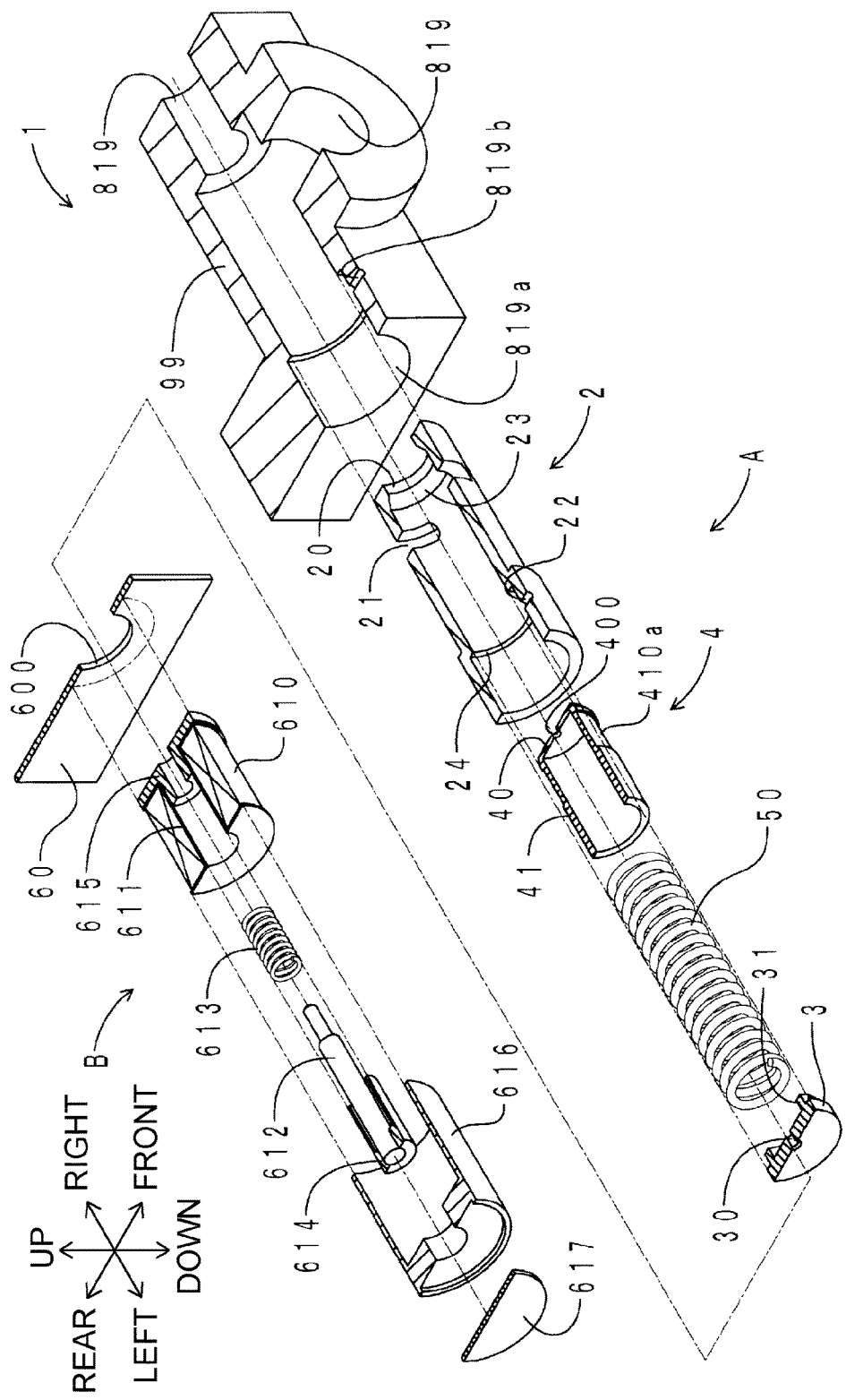
FIG. 4 is an exploded perspective sectional view of the oil level regulating apparatus.
Figure 5:
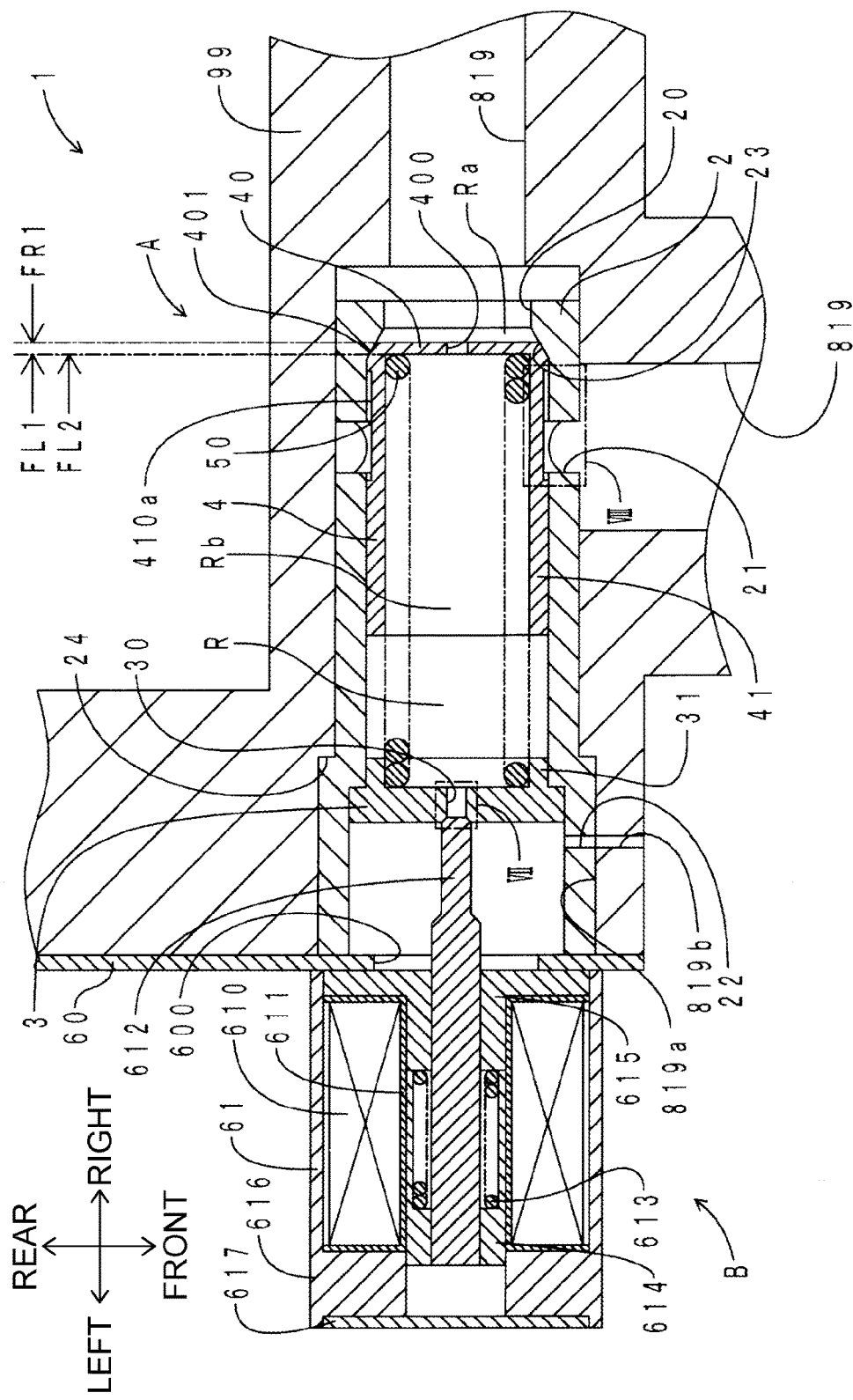
FIG. 5 is a transverse sectional view of the oil level regulating apparatus in a closed valve state.
Figure 6:
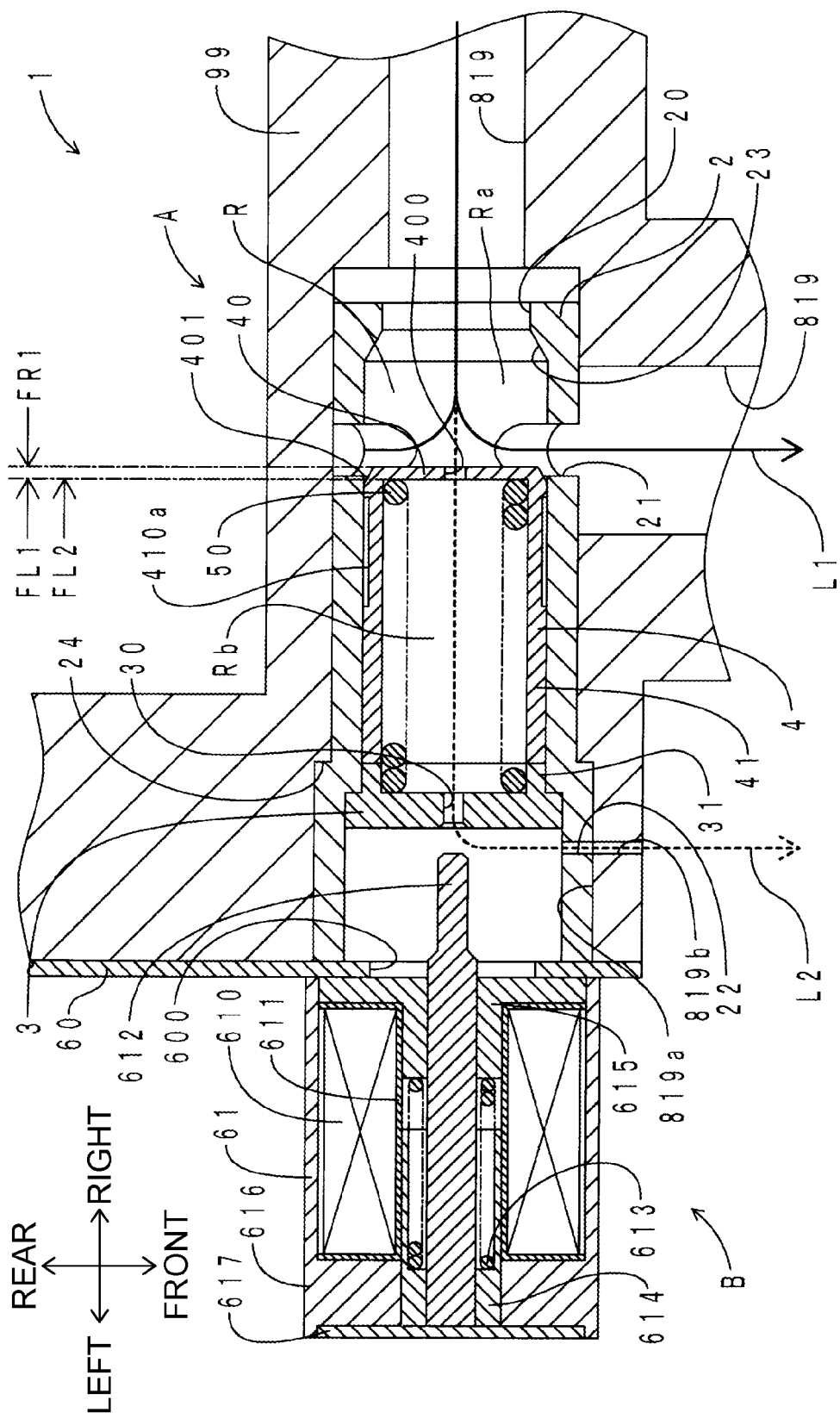
FIG. 6 is a transverse sectional view of the oil level regulating apparatus in an opened valve state.
Figure 7:
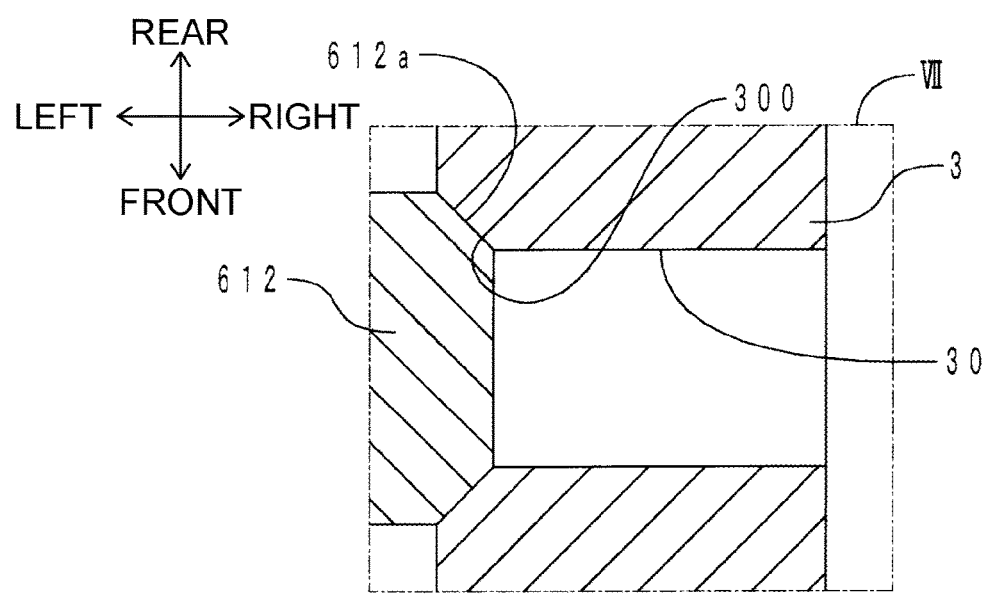
FIG. 7 is an enlarged view of a region in a frame VII indicated in FIG. 5.
Figure 8:
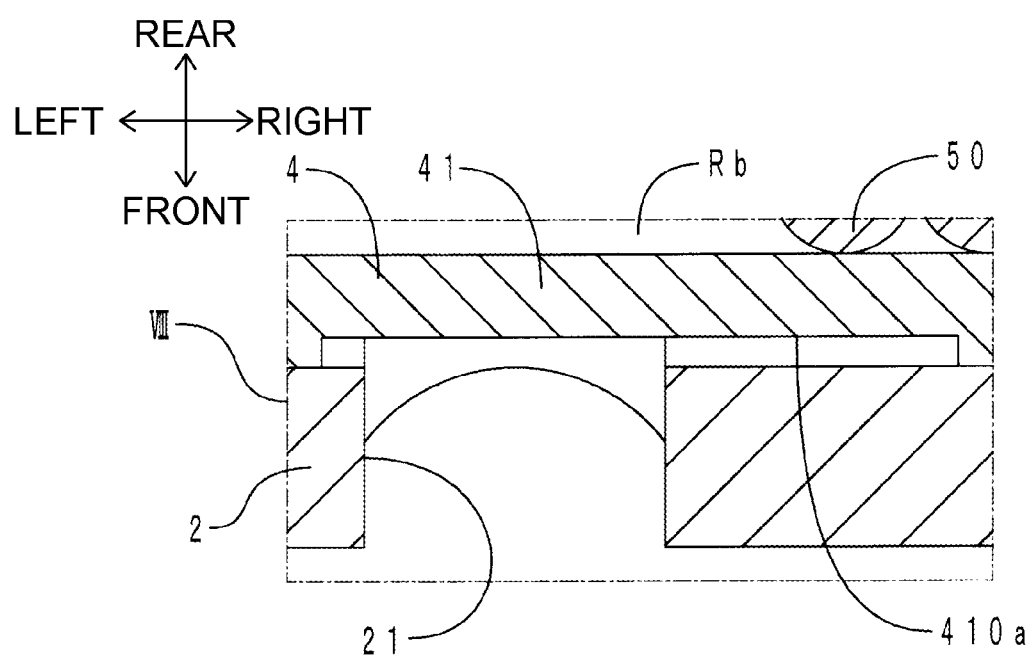
FIG. 8 is an enlarged view of a region in a frame VIII indicated in FIG. 5.

FIG. 3 is a perspective sectional view of the oil level regulating apparatus according to the present embodiment. FIG. 4 is an exploded perspective sectional view of the oil level regulating apparatus. FIG. 5 is a transverse sectional view (taken along line V-V indicated in FIG. 2) of the oil level regulating apparatus in the closed valve state. FIG. 6 is a transverse sectional view of the oil level regulating apparatus in the opened valve state. FIG. 7 is an enlarged view of a region in a frame VII indicated in FIG. 5. FIG. 8 is an enlarged view of a region in a frame VIII indicated in FIG. 5. As shown in FIGS. 3 to 8, the oil level regulating apparatus 1 includes a valve unit A and a solenoid unit B. The valve unit A and the solenoid unit B are provided integrally with each other.

{Valve Unit A}

The valve unit A is inserted, from the left end, to an attachment hole 819*a* of the sub oil hole 819 in the chain cover 99. The valve unit A includes a housing 2, a partition 3, a valve 4, and a spring 50. The spring 50 is included in the concept of the "valve biasing member" according to the present invention.

(Housing 2)

The housing 2 is made of steel and has a stepped cylindrical shape extending transversely. The housing 2 includes an inflow hole 20, two outflow holes 21, a leak hole 22, steps 23 and 24, and a valve chamber R.

The inflow hole 20 is opened at the right end of the housing 2. The inflow hole 20 communicates with the sub oil hole 819 (on the upstream side). The outflow holes 21 are each opened in a side wall of the housing 2. The outflow holes 21 communicate with the sub oil hole 819 (on the downstream side). The outflow holes 21 each have a long hole shape extending along the periphery of the housing 2. The two outflow holes 21 are disposed apart from each other at 180 degrees on the periphery of the housing 2. The leak hole 22 is opened in the side wall of the housing 2. The leak hole 22 is disposed on the left of the outflow holes 21. The leak hole 22 communicates with the outside through a discharge hole 819*b* in the chain cover 99.

The step 23 is disposed on the inner peripheral surface of the housing 2. The step 23 has a slope shape (tapered shape) by reducing in diameter from the left end to the right end. The step 23 defines the right end (or the closed valve position) of a stroke of the valve 4 to be described later. The step 24 is disposed on the inner peripheral surface of the housing 2. The step 24 is located adjacent to a left end opening of the housing 2. The step 24 has a stepped shape by reducing in diameter from the left end to the right end. The valve chamber R is defined inside the housing 2 by the partition 3 to be described later.

(Partition 3)

The partition 3 is made of steel and has a disc shape. The partition 3 is disposed at the step 24. The valve chamber R is defined between the inflow hole 20 of the housing 2 and the partition 3. The partition 3 includes a partition continuous hole 30 and an annular rib 31. The partition continuous hole 30 transversely penetrates the partition 3. As shown in FIG. 7, the partition continuous hole 30 has an inner peripheral surface at the left end, provided with a continuous hole tapered portion 300. The continuous hole tapered portion 300 is reduced in diameter from the left end to the right end. The annular rib 31 is disposed on the right surface of the partition 3. The annular rib 31 is located radially outside the partition continuous hole 30. The annular rib 31 defines the left end (or the opened valve position) of the stroke of the valve 4 to be described later.

(Valve 4)

The valve 4 is made of steel and has a bottomed cylindrical shape (cup shape) opened leftward. The valve 4 is disposed in the valve chamber R. The valve 4 can transversely reciprocate in the valve chamber R. The valve 4 includes a bottom wall 40 and a side wall 41.

The bottom wall 40 has a disc shape and includes a valve continuous hole 400 and a valve tapered portion 401. The bottom wall 40 movably partitions the valve chamber R into an introduction chamber Ra at the front (close to the inflow hole 20) and a pressure chamber Rb at the rear (close to the partition 3). The valve continuous hole 400 transversely penetrates the bottom wall 40. The valve continuous hole 400 connects the introduction chamber Ra and the pressure chamber Rb. The valve tapered portion 401 is disposed on the outer peripheral surface at the right end of the valve 4. The valve tapered portion 401 is reduced in diameter from the left end to the right end. As shown in FIG. 5, the valve tapered portion 401 is in surface contact with the step 23 on its entire circumference in the closed valve state.

The side wall 41 has a cylindrical shape and includes a pressure introducing groove 410*a*. The pressure introducing groove 410*a* is made concave in the entire outer peripheral surface of the side wall 41. As shown in FIG. 8, the pressure introducing groove 410*a* communicates with the outflow hole 21 in the closed valve state.

The spring 50 (shown transparently in FIG. 3) is configured as a coil spring. The spring 50 is accommodated in the pressure chamber Rb. The spring 50 is interposed between the right surface of the partition 3 and the left surface of the bottom wall 40. The spring 50 biases the valve 4 to the right (so as to be closed).

{Solenoid Unit B}

The solenoid unit B projects leftward from the attachment hole 819*a* of the sub oil hole 819 in the chain cover 99. The solenoid unit B is provided continuously from the left end of the valve unit A. The solenoid unit B includes a bracket 60 and a solenoid 61. The solenoid 61 or the oil level regulating apparatus 1 is attached to the attachment hole 819*a* with the bracket 60 being interposed therebetween.

The solenoid 61 includes a coil 610, a bobbin 611, a shaft 612, a spring 613, an armature 614, a core 615, a case 616, and a plate 617. The spring 613 is included in the concept of the "shaft biasing member" according to the present invention.

The case 616 is made of a ferromagnetic material and has a cylindrical shape. The case 616 is provided at the left surface of the bracket 60. The plate 617 is made of a ferromagnetic material and has a disc shape. The plate 617 seals a left end opening of the case 616. The bobbin 611 is made of an insulating material and has a cylindrical shape provided with flanges at right and left ends. The coil 610 is made of an insulating copper wire and is wound around the outer peripheral surface of the bobbin 611. The core 615 is made of a ferromagnetic material and has a cylindrical shape provided with a flange at its right end. The flange of the core 615 seals a right end opening of the case 616. The left end of the core 615 is accommodated in the bobbin 611.

The armature 614 is made of a ferromagnetic material and has a cylindrical shape. The armature 614 is accommodated in the bobbin 611. The armature 614 and the core 615 transversely face each other in the bobbin 611. The shaft 612 has a round bar shape extending transversely. The left end of the shaft 612 is press fitted and fixed into the armature 614. The shaft 612 penetrates a radially inner portion of the core 615. The shaft 612 is inserted to the housing through a shaft insertion hole 600 in the bracket 60. As shown in FIG. 7, the shaft 612 has a shaft tapered portion 612*a*. The shaft tapered portion 612*a* is disposed on the outer peripheral surface at the right end (distal end) of the shaft 612. The shaft tapered portion 612*a* is reduced in diameter from the left end to the right end. As shown in FIG. 7, the shaft tapered portion 612*a* is in surface contact with the continuous hole tapered portion 300 on its entire circumference in the closed valve state. The shaft 612 and the partition continuous hole 30 are aligned linearly and transversely. The shaft 612 opens and closes the partition continuous hole 30 from the left.

The spring 613 (shown transparently in FIG. 3) is configured as a so-called coil spring. The spring 613 is interposed between the right surface of the armature 614 and the left surface of the core 615. The spring 613 biases the shaft 612 toward the left (so as to be distant from the partition continuous hole 30).

[Operation of Oil Level Regulating Apparatus]

Operation of the oil level regulating apparatus according to the present embodiment will be described next. As shown in FIGS. 5 and 6, the bottom wall 40 of the valve 4 receives, from the right, a load FR1 by pressure of the oil O in the sub oil hole 819. In contrast, the bottom wall 40 receives, from the left, a load FL1 by internal pressure (pressure of the oil O) of the pressure chamber Rb. The bottom wall 40 also receives, from the left, a load FL2 by biasing force (pressing force) of the spring 50.

In this manner, the valve 4 receives the load FR1 from the right and the loads FL1 and FL2 from the left. The valve 4 transversely reciprocates depending on the magnitude correlation of these loads. In other words, the oil level regulating apparatus 1 is switched between the closed valve state shown in FIG. 5 and the opened valve state shown in FIG. 6. The valve 4 also receives a load by own weight, buoyancy, or the like of the valve 4 depending on the direction of the attached oil level regulating apparatus 1. Such a load will not be referred to for convenience of description.

{When Turned on}

As shown in FIG. 5, the coil 610 generates magnetic force when the solenoid unit B is turned on. The armature 614 is accordingly attracted to the core 615. The armature 614 or the shaft 612 shifts rightward against biasing force of the spring 613. The right end of the shaft 612 closes the partition continuous hole 30 from the left. As shown in FIG. 7, the shaft tapered portion 612*a* comes into surface contact with the continuous hole tapered portion 300 on its entire circumference. Out of the two holes in communication with the pressure chamber Rb (the valve continuous hole 400 on the right (upstream side) and the partition continuous hole 30 on the left (downstream side)), the partition continuous hole 30 is blocked in this manner. Meanwhile, the valve continuous hole 400 is kept open. The pressure chamber Rb and the introduction chamber Ra are thus made equal in internal pressure. That is, load FL1=load FR1 is established. The load FL1 and the load FR1 offset each other in this manner. The bottom wall 40 or the valve 4 is thus shifted rightward by the load FL2 of biasing force of the spring 50. The valve 4 stops at the closed valve position. The valve tapered portion 401 comes into surface contact with the step 23 on its entire circumference. The inflow hole 20 and the outflow holes 21 are thus disconnected.

In this manner, the oil level regulating apparatus 1 being turned on is kept in the closed valve state. The oil O is supplied from the sub oil hole 819 to none of the piston jet branch paths 818 in the closed valve state. None of the piston jets 94 is thus supplied with the oil O in this case. For example, the solenoid unit B is turned on in order to secure the closed valve state in the cold period.

{When Turned Off}

As shown in FIG. 6, the coil 610 loses magnetic force when the solenoid unit B is turned off. The armature 614 is shifted away from the core 615 by biasing force of the spring 613. The armature 614 or the shaft 612 accordingly shifts leftward. The right end of the shaft 612 opens the partition continuous hole 30 from the left. The shaft tapered portion 612*a* shown in FIG. 7 shifts away from the continuous hole tapered portion 300. The two holes in communication with the pressure chamber Rb (the valve continuous hole 400 on the right (upstream side) and the partition continuous hole 30 on the left (downstream side)) are opened in this manner. Accordingly formed as indicated by the bold line (dotted line) in FIG. 6 is a leak channel L2 including the inflow hole 20, the introduction chamber Ra, the valve continuous hole 400, the pressure chamber Rb, the partition continuous hole 30, the leak hole 22, and the discharge hole 819*b* from the upstream end to the downstream end. The oil O in the sub oil hole 819 partially leaks out of the chain cover 99 through the leak channel L2.

The pressure chamber Rb is thus made smaller in internal pressure than the introduction chamber Ra by the formation of the leak channel L2. That is, load FL1<load FR1 is established. When load FR1>(load FL1+load FL2) is established or when the oil O in the sub oil hole 819 has large pressure, the valve 4 shifts leftward. The valve 4 stops at the opened valve position. The left end of the side wall 41 comes into contact with the annular rib 31. Accordingly formed as indicated by the bold line (solid line) in FIG. 6 is an opened valve oil supply channel L1 including the inflow hole 20, the introduction chamber Ra, and the outflow holes 21 from the upstream end to the downstream end. The oil O in the sub oil hole 819 flows through opened valve oil supply channel L1.

When the oil level regulating apparatus 1 is tuned off and the oil O in the sub oil hole 819 has large pressure (load FR1>(load FL1+load FL2)), the oil level regulating apparatus 1 is switched to the opened valve state in this manner. The oil O is accordingly supplied from the sub oil hole 819 to all the piston jet branch paths 818. All the piston jets 94 are thus supplied with the oil O in this case.

In contrast, when the oil level regulating apparatus 1 is tuned off and the oil O in the sub oil hole 819 has small pressure (load FR1 (load FL1+load FL2)), the oil level regulating apparatus 1 is switched to the closed valve state. The oil O is thus supplied from the sub oil hole 819 to none of the piston jet branch paths 818. None of the piston jets 94 is thus supplied with the oil O in this case. For example, the solenoid unit B is turned off in order to switch between the closed valve state and the opened valve state depending on pressure of the oil O in the warm period.

[Functional Effects]

The functional effects of the oil level regulating apparatus according to the present embodiment will be described next. The valve 4 is provided with the valve continuous hole 400 in the oil level regulating apparatus 1 according to the present embodiment. The oil O can be accordingly supplied from the introduction chamber Ra to the pressure chamber Rb through the valve continuous hole 400.

When the shaft 612 closes the partition continuous hole 30, the downstream end of the pressure chamber Rb is sealed as shown in FIG. 5. Meanwhile, the pressure chamber Rb is supplied with the oil O through the valve continuous hole 400. The pressure chamber Rb is increased in internal pressure. Accordingly, (load FL1+load FL2) is increased. The oil level regulating apparatus 1 is thus switched to the closed valve state. The valve 4 shifts rightward to close the outflow holes 21 in the closed valve state.

When the shaft 612 opens the partition continuous hole 30, the downstream end of the pressure chamber Rb is opened as shown in FIG. 6. The oil O in the pressure chamber Rb accordingly leaks out of the housing 2 through the leak channel L2. The pressure chamber Rb is thus decreased in internal pressure. Accordingly, (load FL1+load FL2) is decreased. The oil level regulating apparatus is thus likely to come into the opened valve state. The valve 4 shifts leftward to open the outflow holes 21 in the opened valve state.

As described above, the valve 4 is provided with the valve continuous hole 400 in the oil level regulating apparatus 1 according to the present embodiment. The oil channel 8 of the chain cover 99 does not need to be provided with any pressure introducing path configured to introduce pressure of the oil O in the sub oil hole 819 to the pressure chamber Rb. The structure of the chain cover 99 as well as the structure of the engine 9 is not complicated in this case.

As shown in FIGS. 5 and 6, the shaft 612 and the partition continuous hole 30 are aligned linearly and transversely in the oil level regulating apparatus 1 according to the present embodiment. In other words, the solenoid unit B and the valve unit A are disposed coaxially with each other. The shaft 612 thus axially separates from or contacts with the partition continuous hole 30 from the left end (in the axial direction). This configuration achieves decrease in stroke of the shaft 612.

As shown in FIG. 7, the shaft tapered portion 612a is disposed on the outer peripheral surface at the right end of the shaft 612 in the oil level regulating apparatus 1 according to the present embodiment. Even in a case where the shaft 612 and the partition continuous hole 30 are eccentric with each other, the shaft tapered portion 612a achieves correction of the eccentricity. The shaft 612 can be thus brought into coaxial contact with the partition continuous hole 30. This configuration can suppress generation of a gap between the shaft 612 and the partition continuous hole 30 in the closed valve state.

As shown in FIG. 7, the continuous hole tapered portion 300 is similarly disposed on the inner peripheral surface at the left end of the partition continuous hole 30 in the oil level regulating apparatus 1 according to the present embodiment. Even in the case where the shaft 612 and the partition continuous hole 30 are eccentric with each other, the continuous hole tapered portion 300 achieves correction of the eccentricity. The shaft 612 can be thus brought into coaxial contact with the partition continuous hole 30. This configuration can suppress generation of a gap between the shaft 612 and the partition continuous hole 30 in the closed valve state.

As shown in FIG. 7, the shaft tapered portion 612a and the continuous hole tapered portion 300 are equal in slant angle. The shaft tapered portion 612a can be thus brought into surface contact with the continuous hole tapered portion 300 on its entire circumference.

When the solenoid 61 is turned off, biasing force of the spring 613 causes the shaft 612 to open the partition continuous hole 30 in the oil level regulating apparatus 1 according to the present embodiment as shown in FIG. 6. The oil level regulating apparatus 1 is likely to be switched to the opened valve state in this case. This configuration is thus likely to secure communication between the inflow hole 20 and the outflow holes 21.

As shown in FIGS. 1 and 2, the oil level regulating apparatus 1 according to the present embodiment is disposed in the sub oil hole 819. The apparatus can thus inclusively regulate flow rates of the oil O supplied to the plurality of piston jets 94.

When the solenoid unit B is turned on, the shaft 612 closes the partition continuous hole 30 as shown in FIG. 5. The oil level regulating apparatus is thus switched to the closed valve state. Communication between the inflow hole 20 and the outflow holes 21 can be blocked in the closed valve state. In other words, flow rates of the oil O supplied to all the piston jets 94 can be regulated to zero. This configuration can thus prevent excessive cooling of the piston 91 at low temperature if the solenoid unit B is turned on in the cold period.

When the solenoid unit B is turned off, the shaft 612 opens the partition continuous hole 30 as shown in FIG. 6. The oil level regulating apparatus is thus likely to come into the opened valve state. Communication between the inflow hole 20 and the outflow holes 21 can be secured in the opened valve state. In other words, the oil O can be supplied to all the piston jets 94. This configuration can thus achieve cooling of the piston at high temperature.

As shown in FIG. 5, the oil level regulating apparatus 1 according to the present embodiment achieves introduction of atmospheric pressure or the like to the pressure introducing groove 410a through the outflow holes 21 in the closed valve state. The side wall 41 of the valve 4 thus receives atmospheric pressure or the like on its entire circumference. This configuration can reduce sliding friction of the valve 4 switched from the closed valve state shown in FIG. 5 to the opened valve state shown in FIG. 6, as compared to a case where the side wall 41 locally receives atmospheric pressure or the like. The oil level regulating apparatus is thus likely to switch from the closed valve state to the opened valve state.

Second Embodiment

Figure 9:
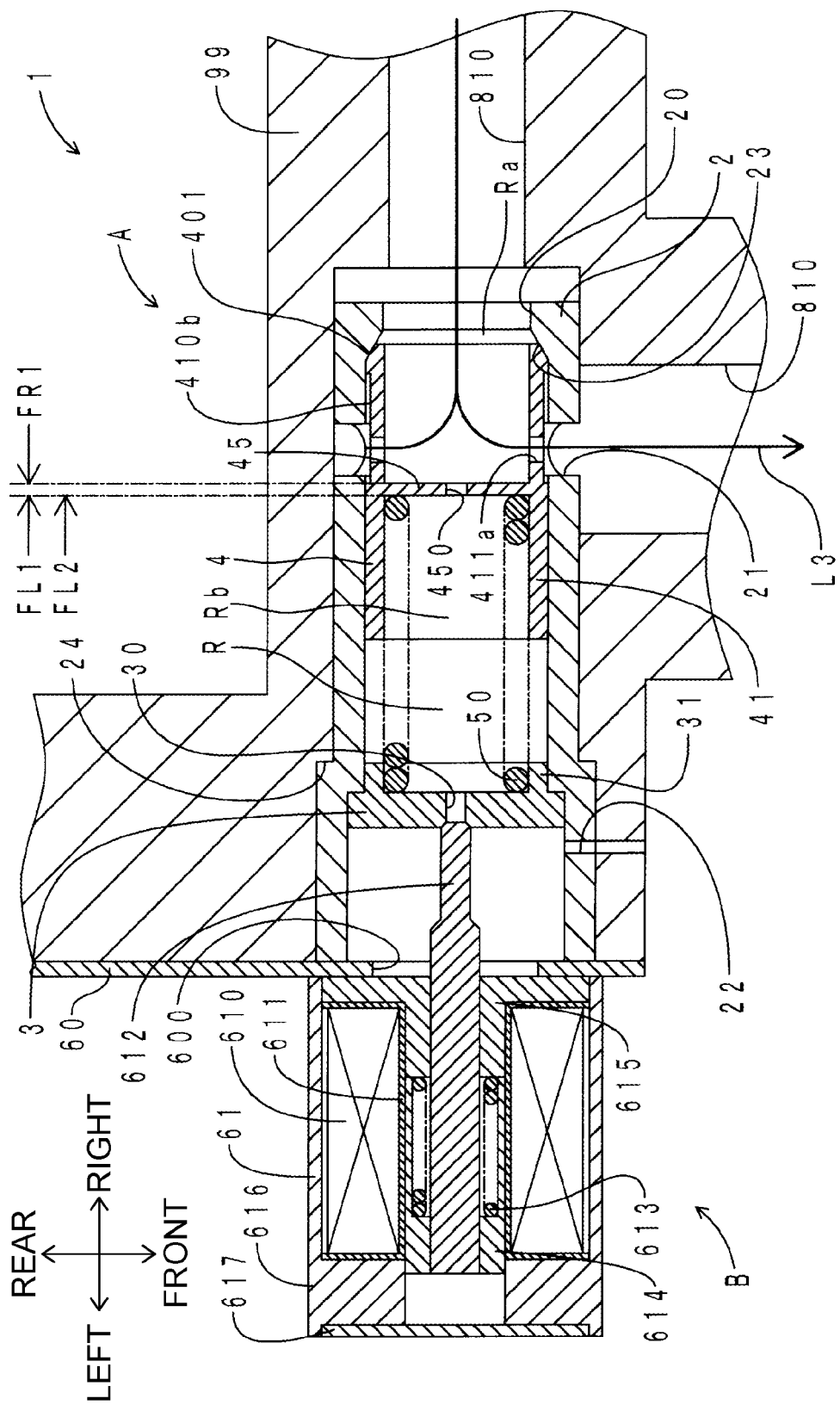
FIG. 9 is a transverse sectional view of an oil level regulating apparatus according to a second embodiment in the closed valve state.

An oil level regulating apparatus according to the present embodiment is different from the oil level regulating apparatus according to the first embodiment in that the valve is provided with a continuous groove and a closed valve switch hole. Furthermore, the oil level regulating apparatus is disposed in the main oil hole. Only the differences will be described herein. FIG. 9 is a transverse sectional view of the oil level regulating apparatus according to the present embodiment in the closed valve state. Portions corresponding to those shown in FIG. 5 are denoted by the same reference signs.

The oil level regulating apparatus 1 according to the present embodiment is disposed in a circle a in the main oil hole 810 of the oil channel 8 shown in FIG. 1. In other words, the oil level regulating apparatus 1 according to the present embodiment is disposed upstream of the plurality of crank shaft branch paths 811.

As shown in FIG. 9, the valve 4 has an intermediate wall 45. The intermediate wall 45 divides the inside of the valve 4 into right and left sections. The intermediate wall 45 is provided therein with a valve continuous hole 450. Two closed valve switch holes 411a and a continuous groove 410b are disposed in the side wall 41 of the valve 4 on the right (upstream side) of the intermediate wall 45. The two closed valve switch holes 411a are disposed apart from each other at 180 degrees on the periphery of the side wall 41. The continuous groove 410b is made concave in the entire outer peripheral surface of the side wall 41. The radially outer end of the closed valve switch hole 411a is opened in the bottom surface (inner peripheral surface) of the continuous groove 410b.

The closed valve switch holes 411a and the continuous groove 410b connect the introduction chamber Ra and the outflow holes 21 in the closed valve state. Accordingly formed as indicated by the bold line (solid line) in FIG. 9 is a closed valve oil supply channel L3 including the inflow hole 20, the introduction chamber Ra, the closed valve switch holes 411a, the continuous groove 410b, and the outflow holes 21 from the upstream end to the downstream end. The oil O in the main oil hole 810 flows through the closed valve oil supply channel L3.

The oil level regulating apparatus 1 according to the present embodiment exerts functional effects of the common configurations, similar to those of the oil level regulating apparatus according to the first embodiment. The oil level regulating apparatus 1 according to the present embodiment can inclusively regulate flow rates of the oil O supplied to the plurality of sliding portions (the main sliding portion S1 and the pin sliding portion S2 shown in FIG. 1).

When the solenoid unit B is turned on, the shaft 612 closes the partition continuous hole 30 as shown in FIG. 9. The oil level regulating apparatus is thus switched to the closed valve state. The closed valve oil supply channel L3 is formed in the closed valve state. The closed valve switch holes 411a are smaller in path sectional area (the sectional area perpendicular to the paths (radially along the closed valve switch holes 411a)) than the outflow holes 21. Flow rates of the oil supplied to all the sliding portions can be thus reduced (not to zero) by the degree of the inserted closed valve switch holes 411a as compared to the opened valve oil supply channel L1 shown in FIG. 6. A cooling effect by the oil can be reduced accordingly. This achieves increase in temperature of the oil provided at these sliding portions. In other words, the oil can be reduced in viscosity. These sliding portions can be reduced in frictional resistance.

When the solenoid unit B is turned off, the shaft 612 opens the partition continuous hole 30 similarly to the indication in FIG. 6. The oil level regulating apparatus is thus likely to come into the opened valve state. The opened valve oil supply channel L1 shown in FIG. 6 is formed in the opened valve state. Flow rates of the oil supplied to all the sliding portions can be increased accordingly. The cooling effect by the oil can be thus enhanced. A lubricating effect by the oil can be also enhanced.

Flow rates of the oil supplied to all the sliding portions provided between the crank shaft and the plurality of bearings can be reduced in the cold period as compared to a case where the oil level regulating apparatus 1 is not provided.

Flow rates of the oil supplied to all the sliding portions provided between the crank shaft and the plurality of bearings can be reduced in the cold period as compared to the other sliding portions connected to the oil channel 8 shown in FIG. 1.

The oil level regulating apparatus 1 according to the present embodiment has the annular continuous groove 410b. This configuration can secure communication between the closed valve switch hole 411a and the outflow hole 21 even in a case where the valve 4 rotates.

Third Embodiment

Figure 10:
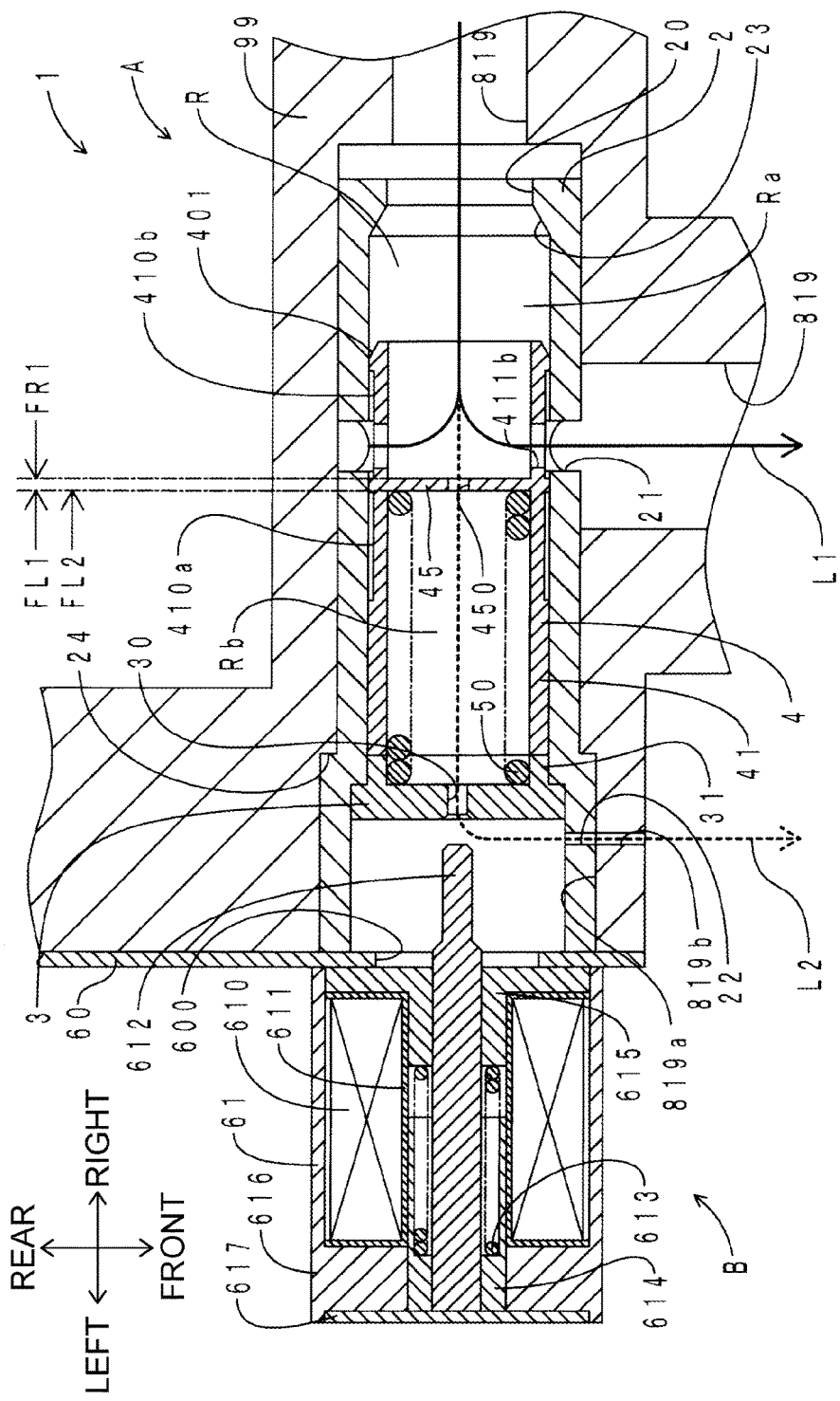
FIG. 10 is a transverse sectional view of an oil level regulating apparatus according to a third embodiment in the opened valve state.

An oil level regulating apparatus according to the present embodiment is different from the oil level regulating apparatus according to the first embodiment in that the valve is provided with a continuous groove and an opened valve switch hole. Only the differences will be described herein. FIG. 10 is a transverse sectional view of the oil level regulating apparatus according to the present embodiment in the opened valve state. Portions corresponding to those shown in FIG. 6 are denoted by the same reference signs.

As shown in FIG. 10, the valve 4 has an intermediate wall 45. The intermediate wall 45 divides the inside of the valve 4 into right and left sections. The intermediate wall 45 is provided therein with a valve continuous hole 450. Two opened valve switch holes 411b and a continuous groove 410b are disposed in the side wall 41 of the valve 4 on the right (upstream side) of the intermediate wall 45. The two opened valve switch holes 411b are disposed apart from each other at 180 degrees on the periphery of the side wall 41. The continuous groove 410b is made concave in the entire outer peripheral surface of the side wall 41. The radially outer end of the opened valve switch hole 411b is opened in the bottom surface (inner peripheral surface) of the continuous groove 410b.

The opened valve switch holes 411b and the continuous groove 410b connect the introduction chamber Ra and the outflow holes 21 in the opened valve state. Accordingly formed as indicated by the bold line (solid line) in FIG. 10 is the opened valve oil supply channel L1 including the inflow hole 20, the introduction chamber Ra, the opened valve switch holes 411b, the continuous groove 410b, and the outflow holes 21 from the upstream end to the downstream end. The oil O in the sub oil hole 819 flows through opened valve oil supply channel L1.

The oil level regulating apparatus 1 according to the present embodiment exerts functional effects of the common configurations, similar to those of the oil level regulating apparatus according to the first embodiment. The oil level regulating apparatus 1 according to the present embodiment can secure communication between the inflow hole 20 and the outflow holes 21 through the opened valve switch holes 411b in the opened valve state. In other words, the inflow hole 20 and the outflow holes 21 can communicate each other through the inside of the valve 4. The outer peripheral surface of the side wall 41 is less likely to receive a load of the flowing oil. The oil level regulating apparatus 1 according to the present embodiment facilitates switching from the opened valve state to the closed valve state. This configuration can thus reduce hysteresis for opening and closing the valve.

The oil level regulating apparatus 1 according to the present embodiment has the annular continuous groove 410b. This configuration can secure communication between the opened valve switch holes 411b and the outflow holes 21 even in a case where the valve 4 rotates.

Other Embodiments

Described above is the oil level regulating apparatus according to each of the embodiments of the present invention. These embodiments should not be particularly limited to the modes described above. The present invention can be achieved in accordance with various modified or improved embodiments made by those skilled in the art.

As shown in FIGS. 5, 6, 9, and 10, the oil level regulating apparatus 1 according to each of the above embodiments is disposed in the sub oil hole 819 or the main oil hole 810. The oil level regulating apparatus 1 can be alternatively disposed in each of the sub oil hole 819 and the main oil hole 810.

The oil level regulating apparatus 1 can be still alternatively disposed in the crank shaft branch path 811 or the piston jet branch path 818 shown in FIG. 1. The oil level regulating apparatus 1 can be provided as the relief valve 802. The oil leaking from the leak channel L2 shown in FIGS. 6 and 10 can be supplied to the chain jet 98 shown in FIG. 1.

As shown in FIG. 6, the above embodiments each adopt the solenoid unit B configured to open the partition continuous hole 30 with the shaft 612 when the solenoid unit B is turned off (the normally open type). The solenoid unit B can be alternatively configured to close the partition continuous hole 30 with the shaft 612 when the solenoid unit B is turned off (the normally closed type). The solenoid 61 can be still alternatively of the push type or the pull type.

There is no particular limitation to the numbers or the sectional shapes perpendicular to the path of the inflow hole 20, the outflow hole 21, the leak hole 22, the valve continuous hole 400, the partition continuous hole 30, the valve chamber R, the pressure introducing groove 410a, the continuous groove 410b, the closed valve switch hole 411a, and the opened valve switch hole 411b. For example, each of the sectional shapes can be a perfect circle, an ellipse, a polygon (e.g. a triangle, a rectangle, a pentagon, or a hexagon), or the like.

As shown in FIGS. 6 and 10, the above embodiments each adopt the member defining the left end of the stroke of the valve 4 (the annular rib 31). Such a member defining the left end of the stroke of the valve 4 is not necessarily provided. Specifically, the left end of the stroke of the valve 4 can be defined by biasing force of the spring 50 and internal pressure of the pressure chamber Rb.

As shown in FIG. 5, the pressure introducing groove 410a is disposed in the outer peripheral surface of the side wall 41 in the above embodiments. The pressure introducing groove 410a can be alternatively disposed in the inner peripheral surface of the housing 2. As shown in FIGS. 9 and 10, the continuous groove 410b is disposed in the outer peripheral surface of the side wall 41 in the above embodiments. The continuous groove 410b can be alternatively disposed in the inner peripheral surface of the housing 2.

As shown in FIG. 5, the spring 50 is disposed in the pressure chamber Rb in the above embodiments. The spring 50 can be alternatively disposed in the introduction chamber Ra. The load FL2 can be applied to the valve 4 by biasing force (tensile force) of the spring 50 in this case.

As shown in FIG. 3, the chain cover 99 and the housing 2 are provided separately from each other in the above embodiments. Alternatively, the chain cover 99 and the housing 2 can be at least partially provided integrally with each other. As shown in FIG. 5, the shaft 612 opens and closes the partition continuous hole 30 in the above embodiments. The leak hole 22 can be opened and closed alternatively.

DESCRIPTION OF REFERENCE SIGNS

1: Oil level regulating apparatus
2: Housing, 20: Inflow hole, 21: Outflow hole, 22: Leak hole, 23: Step, 24: Step
3: Partition, 30: Partition continuous hole, 300 Continuous hole tapered portion, 31: Annular rib
4: Valve, 40: Bottom wall, 400: Valve continuous hole, 401: Valve tapered portion, 41: Side wall, 410a: Pressure introducing groove, 410b: Continuous groove, 411a: Closed valve switch hole, 411b: Opened valve switch hole, 45: Intermediate wall, 450: Valve continuous hole
50: Spring (Valve biasing member)
60: Bracket, 600: Shaft insertion hole
61: Solenoid, 610: Coil, 611: Bobbin, 612: Shaft, 612a: Shaft tapered portion, 613: Spring (Shaft biasing member), 614: Armature, 615: Core, 616: Case, 617: Plate
8: Oil channel, 80: Discharge path, 800: Oil pan, 801: Oil pump, 802: Relief valve, 803: Oil filter, 81: Crank shaft path, 810: Main oil hole (Crank shaft trunk path), 811: Crank shaft branch path, 812: Main bearing internal path, 813: Crank shaft internal path, 818: Piston jet branch path, 819: Sub oil hole (Piston jet trunk path), 819a: Attachment hole, 819b: Discharge hole, 84: Main bearing, 85: Crank bearing
9: Engine, 90: Cylinder block, 900: Support portion, 901: Cap, 91: Piston, 92: Connecting rod, 93: Crank shaft, 930: Main journal, 931: Crank pin, 932: Crank arm, 933: Crank shaft timing gear, 94: Piston jet, 95: Cam shaft, 953: Cam shaft timing gear, 97: Timing chain, 970: Tension lever, 98: Chain jet, 99: Chain cover
A: Valve unit, B: Solenoid unit, Opened valve oil supply channel, L2: Leak channel, L3: Closed valve oil supply channel, O: Oil, R: Valve chamber, Ra, Introduction chamber, Rb: Pressure chamber, S1: Main sliding portion, S2: Pin sliding portion

The invention claimed is:

1. An oil level regulating apparatus for an engine, the oil regulating apparatus comprising:
 a valve unit including:
  a cylindrical housing having an inflow hole opened at a first axial end, an outflow hole opened in a side wall, and a leak hole disposed at a second axial end of the outflow hole,
  a partition separating the outflow hole and the leak hole in the housing, defining a valve chamber close to the outflow hole, and having a partition continuous hole axially penetrating the partition, a valve disposed in the valve chamber, configured to reciprocate axially, dividing the valve chamber into an introduction chamber close to the inflow hole and a pressure chamber close to the partition, and having a valve continuous hole axially penetrating the valve, and a valve biasing member disposed in the valve chamber and biasing the valve toward the first axial end; and a solenoid unit including a solenoid having a reciprocable shaft; wherein a leak channel is defined as an oil channel including the inflow hole, the introduction chamber, the valve continuous hole, the pressure chamber, the partition continuous hole, and the leak hole, the shaft is configured to open and close the leak channel on a downstream side of the pressure chamber, the valve is switched to a closed valve state of closing the outflow hole when the shaft closes the leak channel, the valve has a closed valve switch hole, which is smaller in path sectional area than the outflow hole, in communication with the introduction chamber, and the closed valve switch hole communicates with the outflow hole in the closed valve state.

2. The oil level regulating apparatus for an engine according to claim 1, wherein the solenoid unit is disposed at the second axial end of the housing, the valve unit and the solenoid unit are provided integrally with each other, the leak hole is opened in the side wall, and the shaft and the partition continuous hole are linearly aligned along the axis of the housing and the shaft axially opens and closes the partition continuous hole.

3. The oil level regulating apparatus according for an engine to claim 2, wherein the shaft opens the leak channel when the solenoid loses magnetic force.

4. The oil level regulating apparatus for an engine according to claim 3, wherein the housing is disposed on a piston jet trunk path of the oil channel having a crank shaft trunk path and the piston jet trunk path branched on a downstream side of an oil filter, and a plurality of piston jet branch paths branch connected to the piston jet trunk path and configured to supply a piston jet with the oil, the shaft closes the leak channel in a cold period immediately after an engine starts and the engine is not yet warmed, and the shaft opens the leak channel in a warm period after the engine is warmed.

5. The oil level regulating apparatus for an engine according to claim 3, wherein the solenoid has a shaft biasing member biasing the shaft so as to be distant from the leak channel.

6. The oil level regulating apparatus for an engine according to claim 5, wherein the housing is disposed on a piston jet trunk path of the oil channel having a crank shaft trunk path and the piston jet trunk path branched on a downstream side of an oil filter, and a plurality of piston jet branch paths branch connected to the piston jet trunk path and configured to supply a piston jet with the oil, the shaft closes the leak channel in a cold period immediately after an engine starts and the engine is not yet warmed, and the shaft opens the leak channel in a warm period after the engine is warmed.

7. The oil level regulating apparatus for an engine according to claim 2, wherein the housing is disposed on a piston jet trunk path of the oil channel having a crank shaft trunk path and the piston jet trunk path branched on a downstream side of an oil filter, and a plurality of piston jet branch paths branch connected to the piston jet trunk path and configured to supply a piston jet with the oil, the shaft closes the leak channel in a cold period immediately after an engine starts and the engine is not yet warmed, and the shaft opens the leak channel in a warm period after the engine is warmed.

8. The oil level regulating apparatus for an engine according to claim 1, wherein the shaft opens the leak channel when the solenoid loses magnetic force.

9. The oil level regulating apparatus for an engine according to claim 8, wherein the solenoid has a shaft biasing member biasing the shaft so as to be distant from the leak channel.

10. The oil level regulating apparatus for an engine according to claim 9, wherein the housing is disposed on a piston jet trunk path of the oil channel having a crank shaft trunk path and the piston jet trunk path branched on a downstream side of an oil filter, and a plurality of piston jet branch paths branch connected to the piston jet trunk path and configured to supply a piston jet with the oil, the shaft closes the leak channel in a cold period immediately after an engine starts and the engine is not yet warmed, and the shaft opens the leak channel in a warm period after the engine is warmed.

11. The oil level regulating apparatus for an engine according to claim 8, wherein the housing is disposed on a piston jet trunk path of the oil channel having a crank shaft trunk path and the piston jet trunk path branched on a downstream side of an oil filter, and a plurality of piston jet branch paths branch connected to the piston jet trunk path and configured to supply a piston jet with the oil, the shaft closes the leak channel in a cold period immediately after an engine starts and the engine is not yet warmed, and the shaft opens the leak channel in a warm period after the engine is warmed.

12. The oil level regulating apparatus for an engine according to claim 1, wherein the housing is disposed on a piston jet trunk path of the oil channel having a crank shaft trunk path and the piston jet trunk path branched on a downstream side of an oil filter, and a plurality of piston jet branch paths branch connected to the piston jet trunk path and configured to supply a piston jet with the oil, the shaft closes the leak channel in a cold period immediately after an engine starts and the engine is not yet warmed, and the shaft opens the leak channel in a warm period after the engine is warmed.

* * * * *